United States Patent
Bourrousse et al.

(10) Patent No.: US 9,783,632 B2
(45) Date of Patent: Oct. 10, 2017

(54) URETHANE ACRYLATES FOR CURABLE COATINGS

(71) Applicant: Arkema France, Colombes (FR)

(72) Inventors: Charles Bourrousse, Paris (FR); Philippe Ciceron, Senlis (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/028,971

(22) PCT Filed: Oct. 13, 2014

(86) PCT No.: PCT/FR2014/052603
§ 371 (c)(1),
(2) Date: Apr. 13, 2016

(87) PCT Pub. No.: WO2015/055935
PCT Pub. Date: Apr. 23, 2015

(65) Prior Publication Data
US 2016/0264715 A1  Sep. 15, 2016

(30) Foreign Application Priority Data

Oct. 14, 2013 (FR) .................... 13 59982

(51) Int. Cl.
| | |
|---|---|
| *C08G 18/67* | (2006.01) |
| *C08G 18/78* | (2006.01) |
| *C08F 290/00* | (2006.01) |
| *C09D 175/16* | (2006.01) |
| *C08G 18/24* | (2006.01) |
| *C08F 290/06* | (2006.01) |
| *C09D 11/101* | (2014.01) |
| *C09D 11/30* | (2014.01) |

(52) U.S. Cl.
CPC ........ *C08G 18/672* (2013.01); *C08F 290/067* (2013.01); *C08G 18/246* (2013.01); *C08G 18/7837* (2013.01); *C09D 11/101* (2013.01); *C09D 11/30* (2013.01); *C09D 175/16* (2013.01)

(58) Field of Classification Search
CPC ...... C08G 18/67; C08G 18/24; C08G 18/672; C08G 18/7837; C08G 18/246; C08F 290/067; C09D 175/16; C09D 11/101; C09D 11/30
USPC .......................................................... 524/555
See application file for complete search history.

(56) References Cited

U.S. PATENT DOCUMENTS

| | | | |
|---|---|---|---|
| 5,739,251 A * | 4/1998 | Venham ............... | C08G 18/672 252/182.18 |
| 2007/0191570 A1* | 8/2007 | Weikard ............... | C08G 18/672 528/51 |
| 2008/0255264 A1* | 10/2008 | Hong ................... | C08G 18/672 522/96 |

FOREIGN PATENT DOCUMENTS

| | | |
|---|---|---|
| WO | WO 02/061002 A2 | 8/2002 |
| WO | WO 2007/043728 A1 | 4/2007 |

* cited by examiner

*Primary Examiner* — Michael M Bernshteyn
(74) *Attorney, Agent, or Firm* — Christopher R. Lewis

(57) ABSTRACT

A urethane (meth)acrylate not comprising caprolactone is the product of reaction of A) a monoalcohol bearing from 1 to 5 (meth)acrylates, B) an allophanate-modified polyisocyanate, C) optionally, in the presence of a saturated polyol of functionality 2 to 3, D) optionally, in the presence of an unsaturated polyol with a hydroxyl functionality of 2 to 4, said polyol being $C_3$ to $C_{18}$, E) optionally, in the presence of a reactive diluent. A process for preparing the urethane (meth)acrylate includes reacting the monoalcohol A) and the polyisocyanate B) in the optional presence of C), D), and/or E). The urethane (meth)acrylate may be used in curable compositions for coatings, in particular for varnishes and inks, adhesives, adhesion primers, coatings for wood, metal or plastic and application by spray gun and provide a good compromise between reactivity, flexibility, adherence, hardness, and ease of use.

23 Claims, No Drawings

URETHANE ACRYLATES FOR CURABLE COATINGS

CROSS-REFERENCE TO RELATED APPLICATIONS

This application is a national stage application under 35 U.S.C. §371 of PCT/FR2014/052603, filed Oct. 13, 2014, which claims benefit to French patent application FR 13.59982, filed Oct. 14, 2013.

BACKGROUND OF THE INVENTION

The present invention relates to urethane acrylates (UA) of specific composition, to a process for preparing them and to curable compositions comprising said urethane acrylates for coatings, in particular varnishes and inks, the inks more particularly being inks for inkjet, flexography or screen printing application, for adhesives or for adhesion primers and in particular for application by spray gun, for which applications it is sought to reduce the content of reactive diluents such as multi-functional acrylates (MFA) while at the same time being easy to apply. These coating compositions allow good reactivity and a good compromise of performance qualities, in particular between flexibility, adherence and hardness, while at the same time allowing easy application of these compositions under the application conditions. The acrylates mentioned mean for this invention, unless specifically mentioned otherwise, both acrylates and methacrylates.

Urethane acrylates, in particular urethane acrylate oligomers, are well known for their use in coatings, in particular radiation-curable coatings, more particularly UV-curable coatings, with their application performance qualities of good mechanical toughness being associated with their urethane structure, but at the same time having a limitation in their use due to their high viscosity when compared with other acrylates, especially for certain applications for which a low viscosity is desired, in particular in inkjet printing, application by spray gun and other similar applications.

A known solution for overcoming this problem is to dilute them in a reactive diluent, an acrylate monomer having a lower viscosity, in a sufficient manner so as to have an application formulation which allows, by virtue of its adjusted viscosity, its application in the form of a thin film. However, the need to add reactive diluent up to high levels in order to adjust this viscosity has a negative effect on the compromise of the application performance qualities in particular between flexibility, adherence and hardness, the effect of the diluent (such as MFA) being a reduction in the flexibility and deterioration of the adherence (the capacity to adhere) of the film to the substrate and thus insufficient adhesion. Moreover, even if the curable composition contains 100% solids (i.e. no inert solvent to be evaporated), the content of certain monomers also needs to be limited for the sake of the environment or health concerns. Another solution for overcoming the problem of adjusting the final application viscosity is to perform the application at a temperature above room temperature. However, such a solution is impractical, being neither economical nor environmentally- or health-friendly (emission of monomers), with, what is more, more difficult control of the curing reaction due to the thermal effect and the risk of premature curing of the composition with the need for thermal stabilization of the composition.

Another known solution (see in particular WO 02/061 002) consists in modifying the structure of the urethane acrylate oligomer, in particular by using more flexible hydroxyacrylate structures such as those based on caprolactone giving low-viscosity urethane acrylates. However, this solution again requires improvements in terms of reactivity and of performance qualities in terms of compromise between flexibility and adherence and hardness. The existing products, based on caprolactone, are sparingly reactive under UV and require the addition of MFA. Moreover, they do not satisfy the market demand for increasingly lower viscosities that are required by the latest equipment (inkjet). Thus, the growth of inkjet printing in applications such as flexible packaging and labels calls for levels of mechanical performance in terms of flexibility and toughness that are markedly higher than those hitherto required for this technology. This chemistry based on caprolactone hydroxyacrylate and polyisocyanate, after numerous optimizations, has arrived at its limit with regard to what it can offer to ink formulators. Moreover, the improvement of their toughness by increasing the contents of urethane functions by addition of diols leads to higher viscosities. The very fact of reducing the viscosity of UAs, which is precisely associated with the high cohesion of the urethane groups, leads to loss of the essential properties such as the reactivity, the hardness and the flexibility.

SUMMARY OF THE INVENTION

The present invention solves the mentioned drawbacks of the prior art by proposing a novel urethane acrylate of specific structure and composition not having a caprolactone structure, by means of the selective choice of its essential components, which allows the use of curable compositions.

The first subject of the invention thus relates to a urethane (meth)acrylate of specific composition.

The invention also covers a process for preparing said urethane (meth)acrylate.

Another subject relates to a curable composition comprising said urethane (meth)acrylate and in particular a coating composition, preferably for varnishes and inks, more particularly inkjet inks or flexography inks.

The invention also covers the use of said urethane (meth) acrylate or of said curable composition in said coatings.

Finally, the invention relates to the finished product which is a cured coating which results from the use of said urethane (meth)acrylate or of said curable compositions.

Thus, the first subject of the invention relates to a urethane (meth)acrylate not comprising caprolactone (in its structure), which is the product of reaction of:

A) at least one monoalcohol bearing n (meth)acrylate groups with n ranging from 1 to 5, B) at least one allophanate-modified polyisocyanate, said polyisocyanate bearing at least one allophanate group in its structure and resulting from the reaction of an aromatic or aliphatic or cycloaliphatic initial polyisocyanate in excess with a monoalcohol, under conditions allowing the formation of allophanate by reaction of at least a second molecule of said initial polyisocyanate, with at least one formed urethane group, C) optionally, in the presence of at least one saturated polyol of functionality ranging from 2 to 3, preferably 2, in particular of $C_2$ to $C_{36}$, D) optionally, in the presence of an unsaturated polyol of functionality ranging from 2 to 4 of hydroxyl, in particular diol, optionally bearing at least one or two (meth)acrylate groups, said polyol being $C_3$ to $C_{18}$, preferably $C_6$ to $C_{18}$, E) optionally, in the presence of a reactive diluent, i.e. a diluent which is radically copolymerizable with said urethane (meth)acrylate.

DETAILED DESCRIPTION OF THE INVENTION

The urethane (meth)acrylate according to the invention in which said polyisocyanate B) is an allophanate-modified diisocyanate and derived from a starting polyisocyanate from among: hexamethylene diisocyanate (HMDI), toluene diisocyanate (TDI), isophorone diisocyanate (IPDI) or the respective trimers thereof. The term "respective trimers" means said diisocyanates HMDI, TDI and IPDI. Preferably, B) is an allophanate-modified diisocyanate as defined above. More particularly preferred is a urethane acrylate of the invention with said polyisocyanate B) having the general formula (I) below:

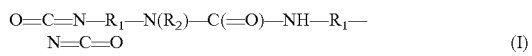

$$O=C=N-R_1-N(R_2)-C(=O)-NH-R_1-N=C=O \quad (I)$$

with $R_1$: $C_6$ alkylene or cycloalkylene, preferably $C_6$ alkylene $R_2$: —C(=O)—$OR_3$ with $R_3$ being the residue of a $C_6$ to $C_{36}$ alcohol, preferably a $C_{12}$ to $C_{36}$ fatty alcohol.

According to a variant of the urethane (meth)acrylate according to the invention, in said monoalcohol A), n=1, i.e. it is monofunctional in (meth)acrylate and A) is chosen from:
a) hydroxyalkyl (meth)acrylates, in particular hydroxyethyl (meth)acrylate (HE(M)A), hydroxypropyl (meth)acrylate (HP(M)A) or hydroxybutyl (meth)acrylate (HB(M)A), preferably HE(M)A,
b) hydroxy polyether (meth)acrylates with Mn not exceeding 500,
c) hydroxy polyester (meth)acrylates with Mn not exceeding 500,
d) epoxy (meth)acrylates (bearing a secondary hydroxyl) or
e) a mixture of at least one to two from among a), b), c) and d).

More particularly, the urethane (meth)acrylate of the invention is based on a monoalcohol A) selected according to option a) described above.

According to another variant of said urethane (meth)acrylate of the invention, in said monoalcohol A), n is at least two, i.e. bearing at least two (meth)acrylate groups and preferably chosen from: trimethylolpropane di(meth)acrylate, pentaerythrityl tri(meth)acrylate, ditrimethylolpropane ether tri(meth)acrylate, dipentaerythrityl ether penta(meth)acrylate.

When said saturated polyol component is present in the structure of the urethane (meth)acrylate according to the invention, in this case, said saturated polyol C) is chosen from optionally alkoxylated $C_2$ to $C_{36}$ aliphatic and $C_6$-$C_{12}$ cycloaliphatic alkane diols, preferably optionally alkoxylated $C_2$ to $C_{36}$ aliphatic alkane diols, optionally alkoxylated $C_3$ to $C_{12}$ alkane triols, diol or triol or tetrol oligoethers with Mn not exceeding 500, and diol, triol or tetrol oligoesters with Mn not exceeding 500. The Mn of these polyol oligomers may be calculated from the functionality and the OH number of these oligomers.

The content of this polyol C), preferably diol, may vary as a function of the targeted compromise of performance qualities given that said polyol, preferably diol C), leads to a chain extension which must be controlled and limited for a better compromise between application viscosity and performance qualities.

According to a particular option, said urethane (meth) acrylate of the invention comprises in its components said unsaturated polyol D) chosen from: trimethylolpropane (mono(meth)acrylate), pentaerythrityl di(meth)acrylate, ditrimethylolpropane ether di(meth)acrylate, dipentaerythrityl ether tetra(meth)acrylate.

Preferably, said urethane (meth)acrylate of the invention has a functionality of at least 2 (meth)acrylates per molecule, preferably ranging from 2 to 6.

As regards the polyisocyanate B), which is a component of said urethane (meth)acrylate of the invention, said monoalcohol forming the starting urethane in the preparation of said polyisocyanate B) is chosen from linear or branched monoalcohols chosen from:
a') $C_6$ to $C_{36}$ alkanols, preferably $C_{12}$ to $C_{36}$ fatty alcohol, and/or
b') ether alcohol or oligoether alcohol with Mn not exceeding 500 and/or
c') ester alcohol or oligoester alcohol with Mn not exceeding 500, preferably b') and/or c').

This monoalcohol, in particular corresponding to $R_3OH$ according to formula (I) mentioned above, is the alcohol which allows the allophanate modification.

According to a particular option, said polyisocyanate B) is a diisocyanate or triisocyanate based on a starting isocyanate which is hexamethylene diisocyanate (HMDI).

The number-average molecular masses Mn cited in the present invention correspond, unless specifically mentioned otherwise, to the values calculated from the known functionality per molecule and from the hydroxyl numbers, otherwise from the molecular formula, if available.

The second subject of the invention relates to a process for preparing said urethane (meth)acrylate of the invention as described above, which process comprises a step of reaction between said monoalcohol A) and said polyisocyanate B) in the optional presence of C) and/or D) and/or E). More particularly, the preparation may take place in said reactive diluent E). Adjustment of the urethane (meth)acrylate content may be done with the same diluent E) and/or another.

The third subject of the invention relates to a curable composition which comprises at least one urethane (meth) acrylate as defined above according to the invention or obtained via a process as defined above.

More particularly, said curable composition comprises, in addition to said urethane (meth)acrylate, at least one reactive diluent E) present during the preparation of said urethane acrylate or added and/or adjusted after its preparation and/or another reactive diluent F). Said reactive diluent E) or said reactive diluent F) may be chosen from (meth)acryl monomers with a functionality ranging from 1 to 6, preferably from 1 to 4, in particular from: optionally alkoxylated polyol (meth)acrylic esters, epoxy (meth)acrylates, urethane (meth) acrylates, aminoacrylates, ether ester (meth)acrylates.

According to a preferred option, said curable composition is a composition that is curable by radiation, in particular UV, electron beam or laser or LED, or by peroxide, or both. Said radiation includes UV radiation, electron beam (EB), LED (light-emitting diode) or laser, said radiation preferably being UV or laser or LED. In the case of a photocurable composition, i.e. curable by UV, laser or LED, it also comprises a photoinitiator which is absent in the case of an electron beam.

More particularly, said curable composition is a coating composition, in particular from among:

varnishes, in particular anticorrosion varnishes and nail varnishes, inks, preferably inks for inkjet or flexography or screen printing application, or for adhesives, in particular laminating adhesives, adhesion primers or for application by spray gun, more particularly.

These coatings are more particularly for substrates such as wood, metal or plastic.

According to a more particular option, said coating composition is photocurable, i.e. curable by UV radiation or laser or LED.

The weight content of said urethane (meth)acrylate may be, according to a first possibility, at least 10% and preferably from 10% to 50% relative to the total weight of urethane (meth)acrylate and of said reactive diluent E) and/or F). Such a composition is suitable in particular for the ink applications mentioned.

According to a second possibility, said content is at least 30% and preferably from 50% to 75% relative to the total weight of urethane (meth)acrylate and of said reactive diluent E) and/or F). Such a composition is suitable in particular for a varnish or adhesive application, in particular laminating adhesives, or for adhesion primers.

Another subject of the invention relates to the use of a urethane (meth)acrylate according to the invention as defined above or obtained via a, process according to the invention or of a curable composition as defined above still according to the invention, in curable coating compositions, in particular from among:

varnishes, in particular anticorrosion varnishes and nail varnishes, inks, preferably inks for inkjet or flexography or screen printing application, or for adhesives, in particular laminating adhesives, adhesion primers or for application by spray gun, more particularly.

More particularly, in said use, said coatings are inks for inkjet or flexography or screen printing application, more preferentially inks for inkjet application.

These coatings are more particularly for substrates such as wood, including agglomerated panels, cardboard, paper, including metallized paper, plastic, ceramic and metal.

As a final subject, the invention relates to a cured coating, in particular varnish or ink, characterized in that it results from at least one urethane (meth)acrylate as defined above according to the invention or from a urethane (meth)acrylate obtained via a process according to the invention or from a curable composition as defined above according to the invention. Preferably, said coating is an ink for inkjet or flexography or screen printing application, more preferentially an inkjet ink.

EXAMPLES

The examples that follow are given as illustrations of the invention and of its performance qualities and do not in any way limit its scope.

1) Starting Materials Used (see Table 1)

TABLE 1 starting materials used

| Commercial name (REF) | Chemical name | Abbreviated name | Supplier | Function according to the invention | Functionality |
|---|---|---|---|---|---|
| Tolonate ® XFlo100 | Allophanate Diisocyanate | ADI | Vencorex | Polyisocyanate | 2 |
| Desmodur ® W | 4,4'-Dicyclohexyl-methanediyl diisocyanate | DesW | BAYER | Polyisocyanate | 2 |
| Tolonate ® HDI | Hexamethylene Diisocyanate | HDI | Vencorex | Polyisocyanate | 2 |
| HEA | HydroxyEthylAcrylate | HEA | BASF | Hydroxyacrylate | 1 |
| SR495B | Caprolactone Acrylate | CapA | Sartomer | Hydroxyacrylate | 1 |
| TIB KAT216 | DiOctylTin diLaurate | DOTL | TIB | Catalyst | |
| BHT | Bis-tert-butyl HydroxyToluene | BHT | Innochem | Inhibitor | |

2) Preparation of Urethane Acrylate Products
Procedure for Examples 1 to 4

Example 1 (Invention)

743.2 g of ADI, 1.0 g of BHT and 0.7 g of DOTL are placed in a 1 liter reactor equipped with an anchor stirrer, an air inlet (air sparge) and a thermometer probe. The mixture is brought to 60° C. and 255.1 g of HEA are added over 1 hour while increasing the temperature uniformly to 90° C. The mixture is maintained at this temperature by regularly controlling the isocyanate number (INCO), until its value is less than 0.5 mg KOH/g. A product referenced UA-1 is obtained, having the following characteristics:
Appearance: clear (visual)
Color: 0.7 G (Gardner)
Viscosity at 25° C.: 3.3 Pa·s Example 2 (Comparative)

278.0 g of DesW, 1.0 g of BHT and 0.7 g de DOTL are placed in a 1 liter reactor equipped with an anchor stirrer, an air inlet (air sparge) and a thermometer probe. The mixture is brought to 60° C. and 720.3 g of Cap A are added over 1 hour while increasing the temperature uniformly to 90° C. The mixture is maintained at this temperature by regularly controlling the isocyanate number (INCO), until its value is less than 0.5 mg KOH/g. A product referenced UA-2 is obtained, having the following characteristics:
Appearance:clear
Color:1.0 G
Viscosity at 25° C.: 16.0 Pa·s

Example 3 (Comparative)

This example is performed in the same manner as Example 2, except that the polyisocyanate is ADI at 496.2 g and CapA at 502.1 g. A product referenced UA-3 is obtained, having the following characteristics:
Appearance: clear
Color: 0.9 G
Viscosity at 25° C.: 3.0 Pa·s

Example 4 (comparative)

This example is performed like Example 2, with the following difference: polyisocyanante DesW at 531.4 g and HEA at 466.9 g.
A product referenced UA-4 is thus obtained, having the following characteristics:
Appearance: clear
Color: 0.2 G
Viscosity at 25° C.: not measurable (crystalline solid)

3) Evaluation of the Application Performance Qualities
3.1) Formulations Tested
3.1.1) Standard Evaluation of the Urethane Acrylate Products Alone
The standard formulation used is as follows (weight %):
96% of urethane acrylate product according to Examples 1, 2 and 3, UA-1, UA-2 and UA-3, respectively
4% of photoinitiator Darocur® 1173.
3.1.2) Evaluation of the Products in a Varnish Formulation for Inkjet Application
The standard formulation used is a varnish formulation as follows (weight %):
25% of urethane acrylate product according to Examples 1, 2 and 3, UA-1, UA-2 and UA-3, respectively
15% of SR595 (decane diol diacrylate sold by Sartomer)
30% of SR 508 (dipropylene glycol diacrylate or DPGDA)
25% of SR 217 (t-butyl cyclohexyl acrylate sold by Sartomer)
5% of photoinitiator Darocur® 1173.
3.2) Performance Test and Results
3.2.1) Tests and Methods Used
3.2.1.1) Determination of the Appearance
The product is observed visually in daylight, through a 60 ml colorless glass bottle, to determine whether the product is:
clear: no turbidity, it is comparable to water,
turbid: no longer allowing clear vision through the bottle,
cloudy: opaque bottle, no image can be seen through the bottle.
3.2.1.2) Determination of the Brookfield Viscosity
The viscous resistance of the liquid to be characterized is measured via the torsion of the spring associated with the rotor immersed in the liquid at a given shear rate. The dimensions and shape of the rotor, the container in which the rotor rotates, the spin speed of the rotor and the torsion torque of the calibrated spring are chosen so that the measurable viscosity interval contains the product to be tested.
3.2.1.3) Determination of the Reactivity
The formulation as described generally above is applied as a 12 μm film to a contrast card (Leneta Penoparc charts form 1B®) and is then cured using a Fusion Hg 120 W/cm lamp. The minimum passage speed (in m/min) required to obtain a touch-dry film is measured.
3.2.1.4) For the following hardness, flexibility and acetone resistance tests, the photocured films are left in an air-conditioned room (T=23° C.) for 24 hours after curing and before the measurements.
3.2.1.4.1) Determination of the Persoz Hardness
The formulation to be examined is applied as a 100 μm film to a glass plate and cured with a Fusion Hg 120 W/cm lamp at a speed of 10 m/min.
The number of oscillations before damping of the oscillations (passage from 12° to 4° amplitude) of a pendulum in contact with the coated glass plate is measured according to standard ISO 1522.
3.2.1.4.2) Pencil hardness: tested by the presence or absence of scratches on the cured film (100 μm) with pencils of increasing hardness ranging from 6B to 6H.
3.2.1.4.3) Determination of the Flexibility
The formulation is applied as a 100 μm film to a smooth steel plate 25/10 mm thick (D-46® Q-Panel), and then cured with a Fusion Hg 120 W/cm lamp at a speed of 10 m/min.
The coated plate is curved on cylindrical mandrels according to standard ISO 1519. The result is expressed as the value (in mm) of the smallest radius of curvature that can be inflicted on the coating without it cracking or detaching from the support.
3.2.1.4.4) Determination of the Acetone Resistance
The formulation is applied as a 12 μm film to a glass plate and then cured with a Fusion Hg 120 W/cm lamp at a speed of 10 m/min. The coating is rubbed with a cloth soaked with acetone. The result is the time (expressed in seconds) beyond which the film detaches and/or disintegrates.
3.2.1.4.5) Determination of the Elongation at Break
The formulation is applied as a 120 μm film between two silicone-treated PET (polyethylene terephthalate) films, and then partially cured with a Fusion Hg 120 W/cm lamp at a speed of about 40 m/min. Dumbbell-shaped specimens 5 mm wide, with a working length of 25 mm and 120 μm thick are cut out using a punch according to standard ISO 527 3. Complete curing of these specimens is performed with the same lamp by means of 5 passages at 5 m/min.
A traction test is performed at room temperature and at a constant speed of displacement (10 mm/min) on an Instron® 5564 machine. The stress as a function of the strain of the specimen is recorded.
3.2.1.4.6) Determination of the Adhesion
The varnish formulation for inkjet application is applied as 6 μm films onto various types of plastic supports (ABS, PC (polycarbonate), PET, PVC) and then cured with a Fusion Hg 120 W/cm lamp at a speed of 10 m/min. Two series of incisions of 10 perpendicular lines are made, thus producing a 100-square checkerboard, and an adhesive tape of given adhesion force is then stripped off. The number of squares stripped off out of the 100 as described above is then counted, according to standard ISO 2409. The result is reported numerically on a scale from 0 to 5, 0 corresponding to the stripping of all 100 squares, and 5 corresponding to no stripping.
3.2.2) Results by Performance
3.2.2.1) Standard Evaluation of the Urethane Acrylate Products Alone

| UA product tested alone | Reactivity (m/min) | Persoz hardness (cycles) | Flexibility (mm) | Acetone resistance (s) | Adhesion |
|---|---|---|---|---|---|
| UA-1 | 5 | 35 | 3 | 80 | 2 |
| UA-2 | 3 * 5 | 41 | 3 | 146 | 4 |

3.2.2.2) Compared Evaluation of Varnish Formulations for Inkjet Application

| UA product of tested formulation | Flexibility (mm) | Acetone resistance (s) | Adhesion | Elongation at break (%) | Young's modulus |
|---|---|---|---|---|---|
| UA-1 | 8 | 28 | 4 | 10 | 600 |
| UA-2 | 6 | 25 | 4 | 4 | 500 |

The performance levels in terms of acetone resistance and adhesion are equilibrated in the formulated systems (varnish for inkjet application) relative to the urethane acrylate products evaluated alone. The percentage of elongation at break is significantly higher for UA-1 (150% increase) with similar Young's modulus values. This means that the cohesive energy of the formulation according to the invention is significantly higher than that of the representative formulation of the prior art.

The same tests were performed on compared formulations having the same viscosity of 40 mPa·s corresponding to 37% by weight for UA-1 and for UA-2 maintained at 25% by weight.

The results are as follows:

| UA product of tested formulation | Flexibility (mm) | Acetone resistance (s) | Adhesion | Elongation at break (%) |
|---|---|---|---|---|
| 37% UA-1 | 6 | 42 | 4 | 13 |
| UA-2 | 6 | 25 | 4 | 4 |

The 50% increase in the content of UA-1 in the varnish formulation for inkjet application brings about an increase in the performance qualities in terms of flexibility and elongation at break relative to the initial composition containing 25% UA-1. This confirms the greater toughness of the urethane acrylate product according to the invention relative to that of the prior art.

The invention claimed is:

1. A urethane (meth)acrylate, comprising the product of reaction of:
   A) at least one monoalcohol bearing n (meth)acrylate groups with n ranging from 1 to 5,
   B) at least one allophanate-modified polyisocyanate, said polyisocyanate bearing at least one allophanate group in its structure and resulting from the reaction of an aromatic or aliphatic or cycloaliphatic initial polyisocyanate in excess with a monoalcohol, under conditions allowing the formation of allophanate by reaction of at least a second molecule of said initial polyisocyanate, with at least one formed urethane group, wherein said polyisocyanate has the general formula (I) below:

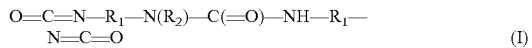

O=C=N—$R_1$—N($R_2$)—C(=O)—NH—$R_1$—N=C=O    (I)

with $R_1$: C6 alkylene or cycloalkylene,
   $R_2$: —C(=O)—$OR_3$
   with $R_3$ being the residue of a $C_6$ to $C_{36}$ alkanol,
   C) optionally, in the presence of at least one saturated polyol of functionality ranging from 2 to 3,
   D) optionally, in the presence of an unsaturated polyol of functionality ranging from 2 to 4 of hydroxyl, optionally bearing at least one or two (meth)acrylate groups, said polyol being $C_3$ to $C_{18}$,
   E) optionally, in the presence of a reactive diluent, which is a diluent which is radically polymerizable with said urethane (meth)acrylate,
   wherein the urethane (meth)acrylate does not comprise caprolactone in its structure.

2. The urethane (meth)acrylate as claimed in claim 1, wherein said polyisocyanate B) is an allophanate-modified diisocyanate having trimers and derived from a starting polyisocyanate from among: hexamethylene diisocyanate (HNDI), toluene diisocyanate (TDI), isophorone diisocyanate (IPDI) or the trimers of the allophanate-modified diisocyanate.

3. The urethane (meth)acrylate as claimed in claim 1, wherein, in said monoalcohol A), n=1 and said monoalcohol A) is selected from the group consisting of:
   a) hydroxyalkyl (meth)acrylates,
   b) hydroxy polyether (meth)acrylates with Mn not exceeding 500,
   c) hydroxy polyester (meth)acrylates with Mn not exceeding 500,
   d) epoxy (meth)acrylates (bearing a secondary hydroxyl) and
   e) a mixture of at least one to two from among a), b), c) and d).

4. The urethane (meth)acrylate as claimed in claim 3, wherein said monoalcohol A) is option a).

5. The urethane (meth)acrylate as claimed in claim 1, wherein, in said monoalcohol A), n is at least two, and said monoalcohol A) is selected from: the group consisting of trimethylolpropane di(meth)acrylate, pentaerythrityl tri(meth)acrylate, ditrimethylolpropane ether tri(meth)acrylate, and dipentaerythrityl ether penta(meth)acrylate.

6. The urethane (meth)acrylate as claimed in claim 1, wherein said saturated polyol C) is selected from the group consisting of optionally alkoxylated $C_2$ to $C_{36}$ aliphatic and $C_6$-$C_{12}$ cycloaliphatic alkane dials, optionally alkoxylated $C_3$ to $C_{12}$ alkane triols, diol or triol or tetrol oligoethers with Mn not exceeding 500, and diol, triol or tetrol oligoesters with Mn not exceeding 500.

7. The urethane (meth)acrylate as claimed in claim 1, wherein said unsaturated polyol D) is selected from the group consisting of:
   trimethylolpropane mono(meth)acrylate, pentaerythrityl di(meth)acrylate, ditrimethylolpropane ether di(meth)acrylate, and dipentaerythrityl ether tetra(meth)acrylate.

8. The urethane (meth)acrylate as claimed in claim 1, and having a functionality of at least 2 (meth)acrylates per molecule.

9. The urethane (meth)acrylate as claimed in claim 1, wherein said monoalcohol forming the starting urethane in the preparation of said polyisocyanate B) is selected from the group consisting of linear monoalcohols and branched monoalcohols selected from the group consisting of at least one of:
   a') $C_6$ to $C_{36}$ alkanols,
   b') ether alcohol or oligoether alcohol with Mn not exceeding 500 and
   c') ester alcohol or oligoester alcohol with Mn not exceeding 500.

10. The urethane (meth)acrylate as claimed in claim 1, wherein said polyisocyanate B) is a diisocyanate or trilsocyanate based on a starting isocyanate which is HMDI.

11. A process for preparing a urethane (meth)acrylate as claimed in claim 1, wherein the process comprises a step of reaction between said monoalcohol A) and said polyisocyanate B) in the optional presence of C) and/or D) and/or E).

12. A curable composition comprising at least one urethane (meth)acrylate as claimed in claim 1.

13. The curable composition as claimed in claim 12, wherein, in addition to said urethane (meth)acrylate, said at least one reactive diluent E) is present during the preparation of said urethane acrylate or added and/or adjusted after its preparation and/or another reactive diluent F).

14. The curable composition as claimed in claim 13, wherein said reactive diluent E) or said reactive diluent F) comprise (meth)acryl monomers with a functionality ranging from 1 to 6, selected from the group consisting of: optionally alkoxylated polyol (meth)acrylic esters, epoxy (meth)acrylates, urethane (meth)acrylates, aminoacrylates, and ether ester (meth)acrylates.

15. The curable composition as claimed in claim 12, wherein it is a composition that is curable by radiation, or by peroxide, or both.

16. The curable composition as claimed in claim 15, wherein the curable composition is curable by radiation selected from the group consisting of UV, laser, electron beam and LED.

17. The curable composition as claimed in claim 12, wherein the curable composition is a coating composition, selected from varnishes, inks, or adhesives.

18. The composition as claimed in claim 13 wherein the weight content of said urethane (meth)acrylate is at least 10% relative to the total weight of urethane (meth)acrylate and of said reactive diluent E) and/or F).

19. The composition as claimed in claim 13 wherein the weight content of said urethane (meth)acrylate is at least 30% relative to the total weight of the urethane (meth)acrylate and of said reactive diluent E) and/or F).

20. A cured coating wherein the cured coating results from at least one urethane (meth)acrylate as claimed in claim 1.

21. The coating as claimed in claim 20, wherein said coating is an ink for inkjet or flexography or screen printing application.

22. The urethane (meth)acrylate as claimed in claim 1, wherein the said polyol C) is present and is a $C_2$ to $C_{36}$ polyol with a functionality of 2.

23. The urethane (meth)acrylate as claimed in claim 1, wherein the said polyol D) is present and is a $C_6$ to $C_{18}$ diol.

* * * * *